US006833080B2

(12) United States Patent
Pouteau et al.

(10) Patent No.: US 6,833,080 B2
(45) Date of Patent: Dec. 21, 2004

(54) OPTICAL SWITCH WITH MOBILE COMPONENTS AND METHOD FOR MAKING SAME

(75) Inventors: Patrick Pouteau, Voreppe (FR); Jacques Margail, La Tronche (FR)

(73) Assignee: Commissariat a l'Energie Atomique, Paris (FR)

(*) Notice: Subject to any disclaimer, the term of this patent is extended or adjusted under 35 U.S.C. 154(b) by 277 days.

(21) Appl. No.: 10/239,845

(22) PCT Filed: Apr. 13, 2001

(86) PCT No.: PCT/FR01/01158

§ 371 (c)(1),
(2), (4) Date: Oct. 1, 2002

(87) PCT Pub. No.: WO01/79903

PCT Pub. Date: Oct. 25, 2001

(65) Prior Publication Data

US 2003/0138191 A1 Jul. 24, 2003

(30) Foreign Application Priority Data

Apr. 17, 2000 (FR) .............................. 00 04910

(51) Int. Cl.[7] ............................ B29D 11/00; G02B 6/26; G02B 6/42
(52) U.S. Cl. ........................................... 216/24; 385/16
(58) Field of Search ................... 216/2, 24; 385/16, 385/18; 359/197, 212, 214, 223, 224, 225, 226, 291, 872

(56) References Cited

U.S. PATENT DOCUMENTS 3,870,816 A 3/1975 Mason

| 4,626,066 | A | 12/1986 | Levinson |
| 4,844,577 | A | 7/1989 | Ninnis et al. |
| 5,535,047 | A | 7/1996 | Hornbeck |
| 5,982,554 | A | 11/1999 | Goldstein et al. |
| 6,034,807 | A | 3/2000 | Little et al. |
| 6,046,840 | A | 4/2000 | Huibers |

FOREIGN PATENT DOCUMENTS

| EP | 0 962 796 | 12/1999 |
| FR | 2 523 363 | 9/1983 |
| WO | 00 23266 | 4/2000 |

OTHER PUBLICATIONS

K.Y. Lau: "Mem's the word for optical beam manipulations" IEEE Circuits and Devices Magazine, vol. 13, No. 4, pp. 11–18 07/97.

*Primary Examiner*—Gregory Mills
*Assistant Examiner*—Roberts Culbert
(74) *Attorney, Agent, or Firm*—Oblon, Spivak, McClelland, Maier & Neustadt, P.C.

(57) ABSTRACT

Optical switch comprising optical means (120) and driving means (114, 115, 124) on a substrate (100), cooperating with optical means to make them pivot between a rest position and at least one active position. According to the invention, the switch comprises first mobile stop means (122), rigidly fixed to the optical means (120, 130) so that they can pivot with the optical means, and second fixed stop means (128) arranged in a plane approximately parallel to the main face (110) of the substrate and cooperating with the first stop means, to fix the said active position of the optical means.

Application to make an optical cross connect.

19 Claims, 5 Drawing Sheets

OPTICAL SWITCH WITH MOBILE COMPONENTS AND METHOD FOR MAKING SAME

TECHNICAL DOMAIN

This invention relates to an integrated optical switch with moving parts, an optical cross connecting device using the switch, and a process for making the switch.

Optical cross connecting devices can be compared with multiplexers capable of optically selectively connecting one or several optical input channels to one or several output channels. They use optical switches for this purpose.

The invention also relates to on/off type switches, in other words switches that enable or disable the passage of light, and switches that reflect light, or switches that modify a characteristic of light. The switches may have two or more switching states.

Many applications of the invention are in the field of optical telecommunications and optical signal processing.

STATE OF PRIOR ART

Documents (1), (2) and (3) for which the complete references are given at the end of the description, give an illustration of a technological background of the invention.

Document (1) describes a multichannel optical switch equipped with a flexible distribution beam. This beam is provided with an optical microguide, and distributes a light beam applied at an input channel to one output channel selected among several possible output channels.

The use of this type of switch to make an optical cross connect necessitates a large number of components, and therefore a large number of electronic control circuits for these components. Furthermore, the switch creates large optical losses.

A smaller number of components may be used in an optical cross connect of the "in free space" type. In this type of cross connect, for example described in document (2), switches with vertical "torsion" mirrors are used.

The vertical mirrors may occupy a first switching position corresponding to a light reflection mode, and a second switching position corresponding to a light transmission mode.

The mirrors are placed perpendicular to a main face of a support substrate. They may pivot about an axis which is also perpendicular, between two switching positions. The mirrors are moved by applying electrostatic forces between a mirror support plate and a vertical electrode.

In this type of switch, control of the verticality of the mirrors may be critical. A verticality fault of a mirror may cause misalignment of the optical beam reflected by the mirror.

Document (3) also describes a switch in which a mirror is pivoted by electromagnetic forces from a rest position parallel to the substrate, towards an active position perpendicular to the substrate. In this case also, there is the problem in keeping the mirror in its active position while guaranteeing that this position can be maintained with precision.

PRESENTATION OF THE INVENTION

The purpose of this invention is to propose an improved optical switch that does not have the difficulties mentioned above and in which the active position of a mirror or another optical means may be fixed precisely.

Another purpose is to propose a switch that may be an on/off type switch but that can also be designed to have several switching states.

Another purpose is to propose a particularly simply and economic process for making such a switch.

Finally, another purpose of the invention is to propose an optical cross connecting device using the improved optical switch.

More precisely, the objective of the invention to achieve these purposes is an integrated optical switch comprising optical means capable of interacting with a switching light, and driving means connected to the optical means to make them pivot between a first "rest" position and a second "active" position, all fixed on a substrate. According to the invention, the switch comprises first mobile stop means rigidly fixed to the optical means, so that they can pivot with the optical means, and second fixed stop means arranged in a plane approximately parallel to the main face of the substrate and cooperating with the first stop means to fix the said active position of the optical means.

The driving means may be electrostatic means or electromagnetic means.

The pivot axis of the optical means and of the first stop means is preferably parallel to the main face of the substrate.

Since the fixed stop means are parallel to the main face of the substrate, it is possible to adjust the position of the fixed stop means very easily and very precisely. Since the mobile stop means are rigidly fixed to the optical means, the active position of the optical means is also precisely fixed by adjustment of the fixed stop means.

Since the fixed stop means according to the invention may be parallel to the main plane, the precision at which these means are formed is related to the precision of the layer thicknesses. On the other hand, in prior art, these stop means were made by the wall of the recess in the substrate which was perpendicular to the plane of the substrate, and the precision of the position of the optical means was then dependent on the precision of the assembly. This is not the case in the invention.

According to a particular embodiment of the switch, there may be an angular spacing between the mobile stop means and the optical means. Due to the rigid link between the mobile stop means and the optical means, this angle is not changed during the pivoting movement of the optical means.

Thus in the invention, the optical function and the positioning function are dissociated, which is not the case in prior art in which the optical means and the mobile stop were in a parallel plane.

Due to the angular spacing, the stop means are not located in the same plane as the optical means. More precisely, the stop means are outside a plane parallel to a plane containing the optical means in the active position. Therefore, there is no risk of interaction with light and there is no need for a particular antireflection treatment to prevent parasite reflection.

For example, the angle formed by the mobile stop means and the optical means may be a right angle. In this case, if the main face of the substrate comprises fixed stop means, the optical means may be switched such that the optical means extend approximately parallel to the main face of the substrate when in the rest position, and the optical means are approximately perpendicular to the main face of the substrate in at least one of the active positions.

According to another particular aspect of the invention, the driving means may comprise at least one first electrode called the mobile electrode fixed to the optical means so that they can pivot with the optical means, and at least one second electrode called the fixed electrode, fixed to the substrate. A fixed electrode is associated with each mobile electrode, to apply electrostatic pivoting forces between the mobile electrode and the associated fixed electrode.

Advantageously, the first stop means, in other words the mobile stop means fixed to the optical means, may form one or several mobile electrode(s) or may carry one or several mobile electrode(s). The stop means then also perform the function of activating the optical means.

In the special case in which there is an angular spacing between the stop means and the optical means, it is possible to separate the electrode plane from the optical means plane, and thus release optical means from constraints related to the presence of an electrode. This enables a wider choice of the optical means.

In particular, the optical means may comprise one or several optical components, for example chosen from among a mirror, a separating strip, a lens, a strip of absorbent material and a strip of reflecting material, and a diffractive lens.

When the driving means are of the electromagnetic type, the electrodes are replaced by magnetic coils.

In a more sophisticated embodiment of a switch with several active positions, the optical means may have a first part with a first optical property upright on the substrate in a first active position, and a second part with a second optical property different from the first optical property or the same as the first optical property, upright on the substrate in a second active position.

These optical means and the mobile stop means may be pivoted by hinge means connecting them to the substrate.

The hinge means may for example comprise one or several torsion beams extending approximately along the pivot axis.

The torsion beams may also automatically return the optical means into either the active position or the rest position.

The invention also relates to an optical cross connecting device comprising several optical switches like those described above arranged in lines and rows, an optical input channel being associated with each line or row, switches and an optical output channel being associated with each row or line of switches.

The optical cross connecting device may also comprise several optical fibres coupled to the corresponding lines and rows of optical switches. Each fibre is thus associated with an input channel or an output channel of the device.

The invention also relates to a process for making a switch like that described. The process comprises the following steps in sequence:

a) the formation of at least one fixed electrode on a main face of a first substrate, and definition of optical means on a second substrate, parallel to a main face of the second substrate, b) assembly of the fist and second substrates, by putting the said main faces facing each other and c) etching of the second substrate by a free rear face opposite the main face, to form at least one mobile stop in the substrate, rigidly fixed to the optical means, and to release the optical means.

The mobile stop formed in the second substrate may act as a support for the mobile electrode or may form a mobile electrode itself when the substrate material is not insulating. A non-insulating material is a conducting material or a semiconducting material to which an electrical potential may be applied that can generate the electrostatic force necessary to pivot the optical means.

Note also that several stops and/or several mobile electrodes may be formed simultaneously or not simultaneously.

Step a) in the process may also comprise etching of at least one cavity for reception of the optical means in the first substrate.

The cavity holds optical means, particularly in their rest position, such that they completely release a space for passage of the light beam to be switched.

Furthermore, step a) in the process may include the definition of one or several fixed stops in the first substrate, cooperating with the mobile stop in the second substrate, to fix a position of the optical means in the active position and/or the rest position.

The fixed stops form fixed stop means and give a better definition of the active or rest position of optical means. If there are no stops, the fixed stop means may simply be formed by the surface of the main face of the first substrate.

Other characteristics and advantages of the invention will become clearer from the description made with reference to the figures in the attached drawings. This description is provided purely for illustrative purposes and is in no way limitative.

DETAILED DESCRIPTION OF PARTICULAR EMBODIMENTS OF THE INVENTION

In the following description, identical, similar or equivalent parts in the different figures are marked with the same references, to simplify reading. Furthermore, the figures are not all at the same scale for reasons of clarity.

Figure 1:
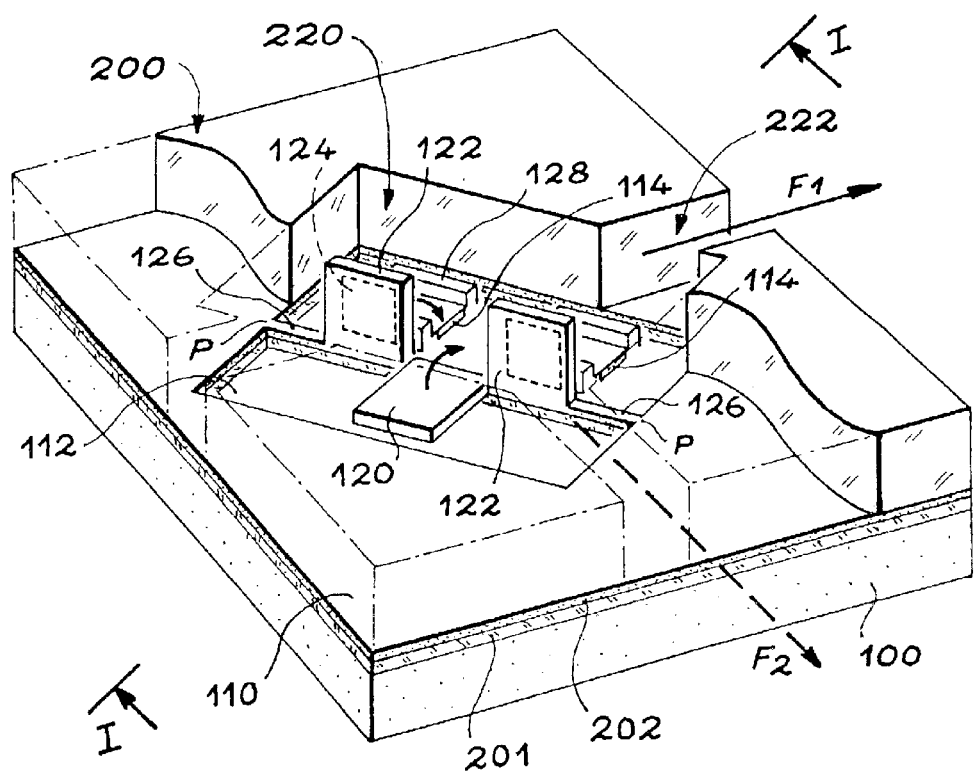
FIG. 1 is a partial exploded diagrammatic view of an optical switch according to the invention.

The switch in FIG. 1 comprises a first substrate 100 with a main face 110.

The main face has a depression 112 in which the fixed electrodes 114 are formed.

The depression 112 is designed to contain a mirror 120 in a rest position. In this example, the mirror 120 forms the optical means in the sense of the invention.

The mirror is rigidly connected to two ribs 122 located on each side of the mirror. In the example shown, these form a right angle with the plane of the mirror.

The ribs are placed facing the fixed-electrodes 114 and carry electrodes 124 called mobile electrodes on their face facing towards the fixed electrodes.

The ribs 122 do not need any electrodes and form the electrodes themselves when they are made from a non-insulating material.

Torsion beams 126 connect the assembly formed by the mirror 120 and the ribs 122 to a fixed part of the substrate 100. They enable pivoting of the mirror and the ribs about an axis parallel to the main face 110. This axis is materialized by beams 126 that form a hinge.

In this respect, it should be specified that the beams 126 are free with respect to the bottom of the depression 112. They are only connected to the fixed part of the substrate at their ends shown by the letter P in FIG. 1. Note also that the mirror 120 and the beams 126 are etched in thin layers 201, 202 inserted between the first substrate 100 and a second substrate 200. This point is not shown in FIG. 1, but it will be described in more detail in the remainder of the text with reference to the following figures.

When no potential difference is applied between the mobile electrodes 124 and the fixed electrodes 114, or when the potential difference is less than a switching threshold, the mirror occupies the bottom position shown in the figure in which it rests in the depression 112.

In this case, a light beam may pass above the substrate along a path materialized by an arrow $F_1$ in the figure. The beam passes through a free switching space 220 and in a first output groove 222 formed in the second substrate 200.

The state in which a beam can follow the path along arrow F1, is a first switching state called the rest state.

When a potential difference greater than a switching threshold is applied between the mobile electrodes 124 and the fixed electrodes 114, the assembly formed by the ribs 122 and the mirror 120 pivots in a direction indicated by small arrows. Pivoting is caused by a rotation torque that is generated from electrostatic forces exerted between the mobile electrodes and the fixed electrodes. This rotation torque must overcome a return torque exerted by the torsion beams 126.

The switching threshold may be determined experimentally or by calculation, and it depends essentially on the surface of the electrodes, their conductivity, their spacing and the return torque of the torsion beams.

The mirror stops pivoting when the ribs 112 stop in contact with the main face 110 of the first substrate 100. In the example in the figure, the main face is equipped with stops 128 called "fixed stops" that cooperate with the ribs to more precisely fix the position of the mirror in its upright position. Thus, the ribs form mobile stop means like those described previously. The fixed stop means are formed by the main face of the first substrate, or by fixed stops when it is equipped with them.

When the ribs are bearing against the stops 128, the mirror occupies the upright or "active" position (not shown) in which a light beam may be reflected along a direction indicated by an arrow $F_2$ in dashed lines.

In the example illustrated, this state is a second switching state called the "active state".

The assembly formed by the mobile electrodes and fixed electrodes forms part of the driving means mentioned above.

Figure 2:
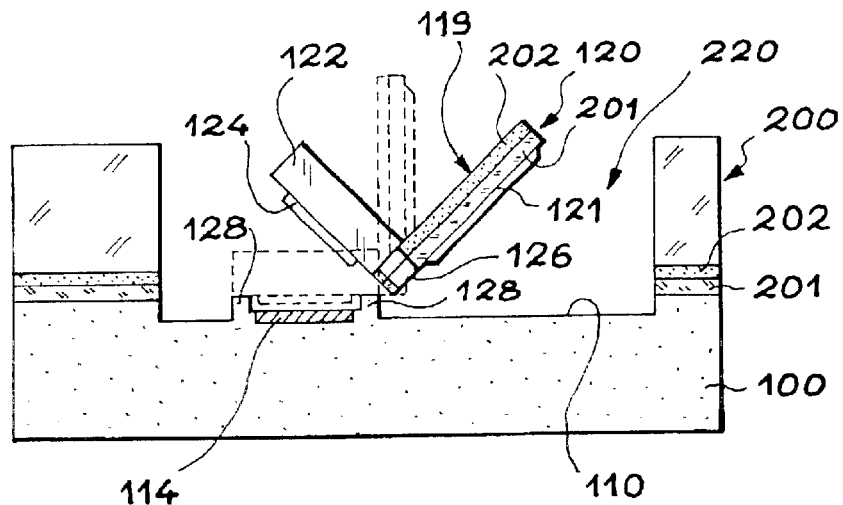
FIG. 2 is a diagrammatic section along a plane I—I of the switch in FIG. 1.

FIG. 2 is a simplified diagrammatic section of the device in FIG. 1 according to the plane I—I shown in FIG. 1.

It shows the mirror 120 and a rib 122 in an intermediate position between the rest position and the active position, in solid lines. It also shows these parts in the active position in dashed lines.

It may be observed that the stops 128 of the main face of the substrate 110 have an adjusted height such that the mirror 120 is perpendicular to the said face in the active position.

In this position, the rib 122 is parallel to the main face of the substrate.

In other applications, other active positions are defined by different height of the stops, or an angle between the ribs and the mirror not equal to 90°.

It can also be observed that the mirror 120 is formed of a support 119 and a layer of reflecting material 121 covering a face of the support. The support 119 is composed of two intermediate layers 201, 202 already mentioned.

Other elements, for which the references are marked in the figure, are identical to those already described with reference to FIG. 1. Therefore, the reader should refer to this description.

Figure 3:
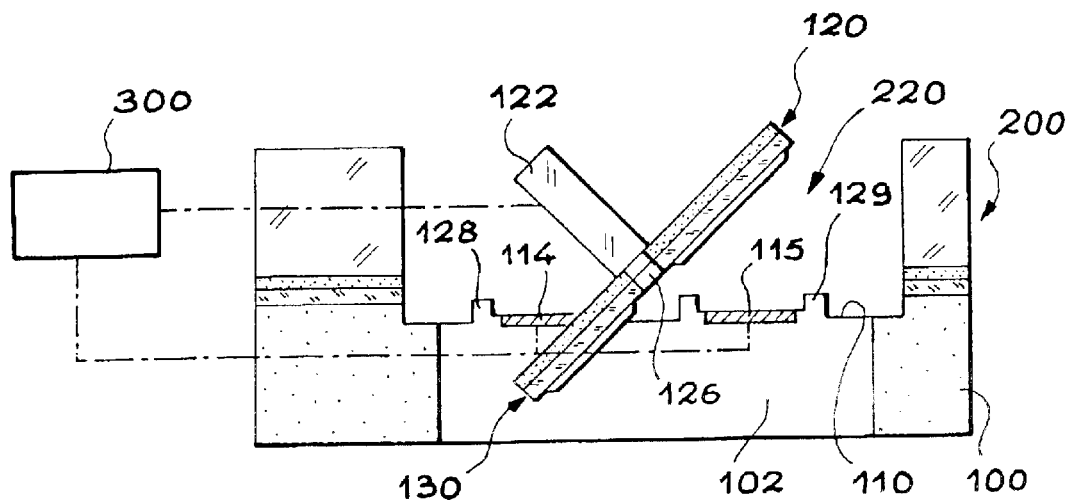
FIG. 3 is a diagrammatic section of a switch forming a variant with respect to FIG. 2.

FIG. 3 shows another possibility for making a switch according to the invention.

In the example in FIG. 3, the optical means comprise a first optical component, actually the mirror 120, extending from one of the sides of the ribs 122 (only one is visible) and another optical component 130, for example a semi-transparent strip or a second mirror, extending on a side opposite the ribs 122.

Similarly, the first substrate 100 has a set of first fixed electrodes 114 and a set of second fixed electrodes 115 arranged on each side of the ribs and the torsion beams 126.

Note that the ribs 122 do not have any electrodes. They are made from a non-insulating material, such that they also form mobile electrodes.

Note also that the first substrate is provided with a groove 102 in which the optical means are free to move.

When no voltage is applied between the electrodes, in other words in the rest switching state, the two optical components 120, 130 are in a position approximately parallel to the main face 110 of the first substrate 100. The ribs 122 are then perpendicular to the substrate. This position corresponds to the rest position, in which the system is automatically returned by the torsion beams 126.

In a first active switching state, a voltage is applied between the ribs 122 which form the mobile electrodes, and the first fixed electrodes 114. The assembly formed by the ribs and the optical means then pivots about the axis of the torsion beams 126 until the ribs come into contact against the stops 128 placed close to the first fixed electrodes 114.

The first optical component 120 is then arranged in the free switching space 220 in which it can act on a light beam. The second optical component 130 fits into the movement groove 102 of the first substrate 100.

In a second active switching state, a switching voltage is applied between the ribs 122 and the second fixed electrodes 115. The assembly formed by the ribs and the optical means then pivots in the opposite direction until the ribs 122 come into contact with the stops 129 placed close to the second fixed electrodes 115. In this state the second optical component 130 moves into the free switching space 220 and the first optical component drops into the movement groove 102.

For example, a device conform with FIG. 3 may be used in an optical cross connect in which it is required to distribute light power onto several output channels.

The mirrors can then be replaced by partially reflecting strips.

The reference 300 diagrammatically indicates the electronic control means provided to apply switching voltages to the electrodes. These means as such are not included in the invention and are not described herein. They can be made using usual techniques in microelectronics or electronics.

As in the previous figures, FIG. 3 shows that the first and second substrates may be separated by two intermediate layers 201, 202. The origin of these layers will appear in the remainder of the text describing a process for manufacturing the optical component.

Figure 4:
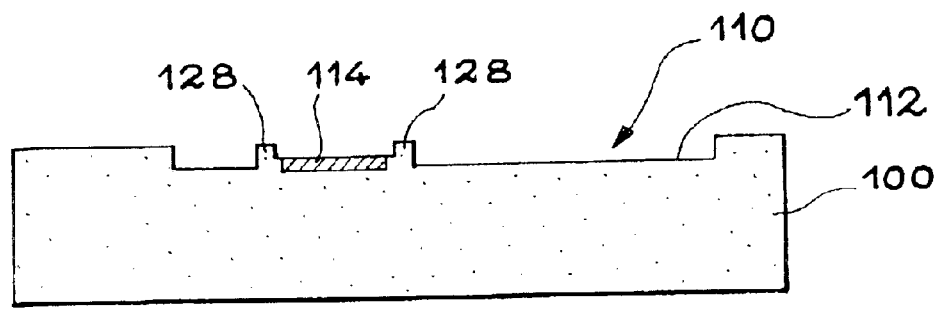
FIGS. 4 to 6 are diagrammatic sections of substrates prepared for the formation of a switch according to the invention.

FIG. 4 shows a sectional view of the preparation of the first substrate 100 during a process for manufacturing of a switch according to the invention. For example, it may be a silicon substrate in which the main face 110 is etched to form a depression 112 and possibly stops 128. The stops 128 delimit a region for the formation of fixed electrodes.

The fixed electrodes 114, only one of which is visible, are formed by deposition and etching of a metallic layer such as a gold layer.

The metallic layer may be electrically isolated from the substrate, if the substrate is conducting. The insulation may be made by depositing an intermediate layer such as silicon oxide.

Similarly, electrical conducting tracks (not shown) are formed to connect the electrodes to the electronic control means 300 mentioned in relation with FIG. 3.

Figure 5:
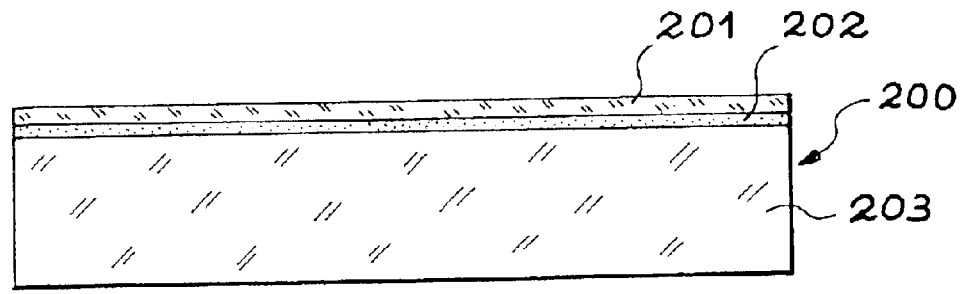

FIG. 5 shows a section through a substrate 200 that can be used to form the second said substrate of the switch.

The substrate 200 has a thin surface layer 201 and a thin buried layer 202, made from a material different from the material on the surface layer. The buried layer 202 separates the surface layer 201 from a solid part 203 of the substrate.

The substrate 200 may for example be of the Silicon On Insulator (SOI) type, which consists of a thin layer of silicon, a buried layer of silicon oxide and a solid part made of silicon, in order.

Figure 6:
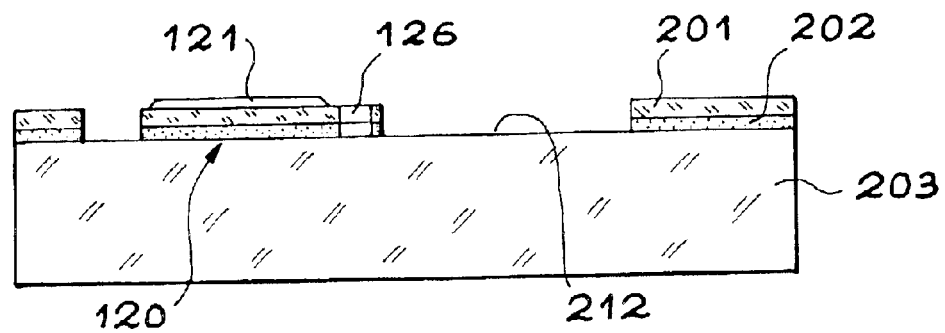

The surface layer 201 and the buried layer 202 are shaped using typical photolithography and etching techniques, to define and surround a plate that will form, or at least support, the optical means of the switch. As shown in FIG. 6, the plate is provided with a reflecting metallic layer 121, and thus forms a mirror. By analogy to the previous figures, the plate forming the mirror is marked as reference 120 and is denoted as a "mirror".

Etching of the surface and buried layers 201 and 202 is also useful to define the torsion beams 126 that prolong the plate (strip) of the mirror. It is also useful to form a depression 212 at the main surface 210 of the second substrate 200. The depression 212 is located in a region approximately symmetrical with the region containing the mirror, with respect to beams 126.

Figure 7:
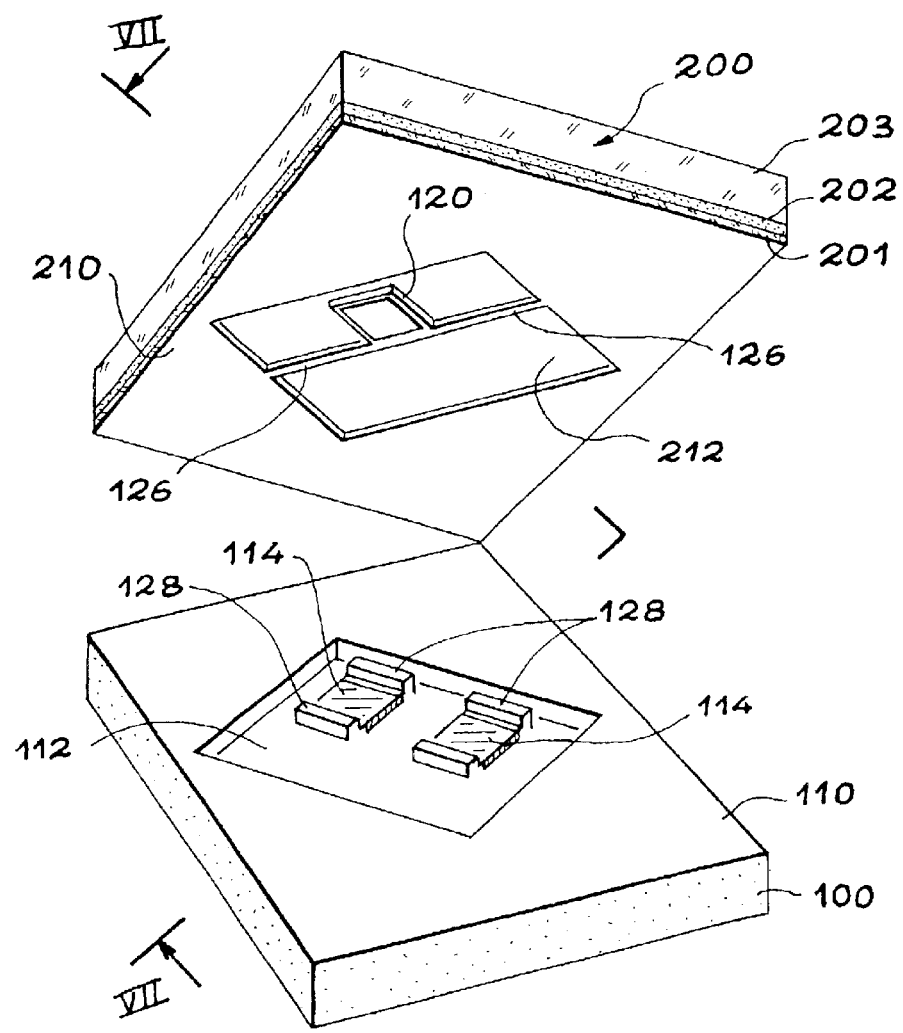
FIG. 7 is a diagrammatic representation of substrates prepared according to FIGS. 4 to 6 in a state preceding their assembly.

FIG. 7 shows a perspective view of the projection of the second substrate 200 on the first substrate 100 just before they come into contact.

FIG. 7 gives a better view of the shapes and locations of the torsion beams 126 and the mirror 120 defined on the second substrate, and the shapes and the positions of electrodes 114 and stops 128 on the first substrate.

In particular, it may observed that the position and dimensions of the depression 112 of the first substrate 100 are provided to contain the mirror 120 and the torsion beams 126 of the second substrate 200. In particular, the depression prevents bonding contact between the first substrate and the torsion beams and the mirror. This prevents these beams from bonding on the first substrate 100.

Similarly, the depression 212 in the second substrate 200 is designed to coincide with the electrodes 114 and the stops 128. It also prevents these parts from bonding together.

The main faces 110 and 210 of the first and second substrates come into contact around their peripheral part without any relief, to cause bonding. This bonding may be direct molecular bonding ("wafer bonding") or bonding using a binder.

Figure 8:
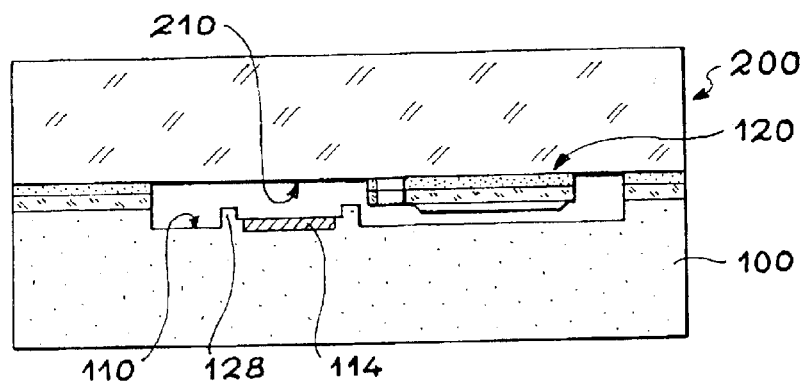
FIGS. 8 and 9 are diagrammatic sections of substrates after their assembly, and illustrate subsequent steps in a process for the formation of the switch according to the invention.

FIG. 8 shows a sectional view of the structure obtained after bonding, along a plane VII—VII shown in FIG. 7.

It may be observed that the first and second substrates are only fixed around part of their periphery, in other words a part in which there are no optical means or driving means.

Figure 9:
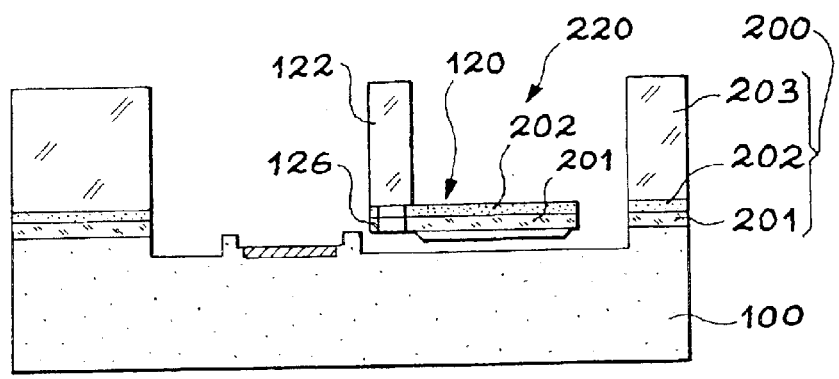

A final step illustrated in FIG. 9 comprises deep etching of the second substrate 200 through a free face of this substrate. It is the "back" face opposite the main face 210.

Etching defines the ribs 122, clears the free switching space 220 and releases the mirror 120.

Anisotropic type etching is done using the buried layer 202 as the etching stop layer to protect the mirror 120.

Furthermore the ribs, preserved during etching are connected to the mirror through the buried layer 202 and are located vertically in line with the torsion beams 126. The position and the shape of the ribs may be fixed by an etching mask not shown.

FIG. 9 is also similar to FIG. 2 described above.

The buried layer 202 on the mirror 120 exposed during etching, may be eliminated if necessary.

The above description refers to the manufacture of a single switch. However, several switches may be made simultaneously on the same substrate.

Figure 10:
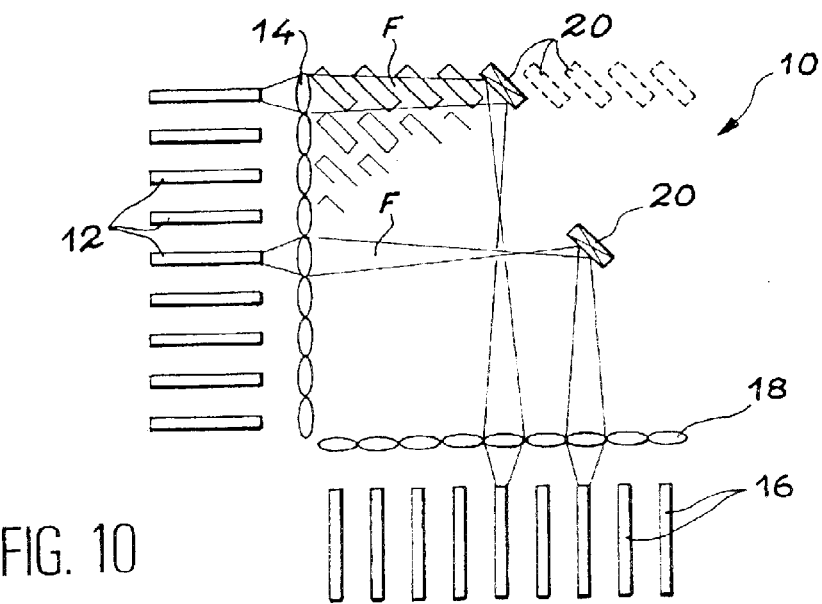
FIG. 10 is a top view of a diagrammatic and simplified representation of an optical cross connecting device including optical switches according to the invention.

As an illustration, FIG. 10 shows an optical cross connect 10 using several optical switches like those described above. These switches, for example with mirrors, are marked as reference 20 and are marked by a cross when in the active state.

The optical cross connect has several input channels coupled to several optical signal input fibres 12. For example, coupling can take place through a network of lenses 14.

Similarly, the cross connect is coupled to several optical signal output fibres 16, through a second network of lenses 18. Each fibre 14 materializes a cross connect output channel.

The optical switches 20 are distributed in lines and in rows, each line being associated with an input channel and each row being associated with an output channel.

When a switch is in an active switching state, its upright mirror for example reflects a beam F received from a signal input fibre to a signal output fibre. The input channel may thus be selectively coupled to the output channels.

DOCUMENTS MENTIONED (1)
FR-A-2 660 444
(2)
"2×2 MEMS FIBER OPTIC SWITCHES WITH SILICON SUB-MOUNT FOR LOW-COST PACKAGING" by Shi-Sheng Lee et al. Solid-State Sensor and Actuator Workshop, Jun. 8–11, 1998, pages 281–284.
(3)
"ELECTROMAGNETIC TORSION MIRRORS FOR SELF-ALIGN FIBER-OPTIC CROSS CONNECTORS BY SILICON MICROMACHINING" by Hirashi Toshiyoshi et al., IEEE Journal of selected topics in quantum electronics, vol. 5, No. 1, 1999, pages 10–17.

What is claimed is:

1. An integrated optical switch comprising an optical means on a substrate capable of interacting with a switching light, and a driving means cooperating with the optical means to make them pivot between a first rest position and at least one second active position, the first optical means rigidly fixed to the optical means so that they can be pivoted with the optical means, and the second fixed stop means formed in a plane approximately parallel to a main face of the substrate and cooperating with the first stop means to fix the said active position of the optical means, the first stop means and the optical means are connected to the substrate by a torsion beam extending along a pivot axis forming a single assembly with the torsion beam, and in the rest position the optical means extends approximately parallel to the main face of the substrate, the switch being characterized in that the angular spacing between the first stop means and the optical means is approximately a right angle.

2. A switch according to claim 1, in which the driving means comprise at least one mobile electrode fixed to the optical means so that it can pivot with the optical means, and at least one fixed electrode that is rigidly attached to the substrate, associated with a corresponding mobile electrode to exert electrostatic pivoting forces between each mobile electrode and the corresponding fixed electrode.

3. A switch according to claim 2, in which the first stop means forms at least one mobile electrode.

4. A switch according to claim 2, in which the first stop means carries at least one mobile electrode.

5. A switch according to claim 1, in which the optical means comprises at least one of a mirror, a separating strip, a lens, a plate of an absorbent material, and a plate of a reflecting material.

6. A switch according to claim 1 in which the optical means has a first part with a first optical property, upright on the substrate in a first active position, and a second part with a second optical property, different from or the same as the first optical property, upright on the substrate in a second active position.

7. An optical cross connecting device comprising several optical switches according to claim 1, arranged in lines and rows of optical switches, an optical input channel being associated with each line or each row of switches and an optical output channel being associated with each row or line of the switch.

8. A cross connecting device according to claim 7, comprising several optical fibers coupled to the lines and rows of optical switches, respectively.

9. A switch according to claim 1, characterized in that the substrate is divided into two parts attached by plane contact faces, one of the parts carrying the second stop means and the other carrying parts supporting the assembly consisting of the torsion beam the first stop means and the second stop means.

10. A process for manufacturing an integrated optical switch comprising an optical means on a substrate capable of interacting with a switching light, and a driving means cooperating with the optical means to make them pivot between a first rest position and at least one second active position, the first optical means rigidly fixed to the optical means so that they can be pivoted with the optical means, and the second fixed stop means formed in a plane approximately parallel to a main face of the substrate and cooperating with the first stop means to fix the said active position of the optical means, the first stop means and the optical means are connected to the substrate by a torsion beam extending along a pivot axis forming a single assembly with the torsion beam, and in the rest position the optical means extends approximately parallel to the main face of the substrate, the switch being characterized in that the angular spacing between the first stop means and the optical means is approximately a right angle, comprising the following steps in sequence:

forming at least one fixed electrode on a main face of a first substrate and defining an optical means on a second substrate parallel to the main face of the second substrate;

assembling the first and second substrates by putting the main faces facing each other; and after said assembling, etching the second substrate by a free rear face opposite the main face, to form at least one mobile stop in the substrate, rigidly fixed to the optical means, and to release the optical means.

11. A process according to claim 10, in which a second substrate made from a non-insulating material is used such that the mobile stop forms an electrode.

12. A process according to claim 10, further comprising forming an electrode on the mobile stop.

13. A process according to claim 10, in which the step of forming further comprises etching at least one cavity in the first substrate to contain the optical means.

14. A process according to claim 10, in which the step of forming further comprises defining at least one fixed stop in the first substrate cooperating with the mobile stop formed in the second substrate to fix a position of the optical means in the active position and/or the rest position.

15. A process according to claim 10, in which the second substrate comprises a surface layer separated from a solid part by a buried layer in which a plate forming the optical means and torsion bars connecting the plate to a fixed part of the surface layer are defined by etching the surface layer.

16. A process according to claim 15, in which a layer of an optical material is deposited on said surface layer in a region in which said plate is defined.

17. A process according to claim 15, in which the step of etching further comprises etching the second substrate with a stop on the buried layer.

18. A process according to claim 15, in which the second substrate is of the SOI (Silicon On Insulator) type.

19. A process according to claim 10, in which at least one groove is etched to enable movement of the optical means in the first substrate.

* * * * *